June 18, 1963    M. D. CHAMBERLAIN    3,094,447
METHOD OF MAKING AN INSULATED ROOF
Filed Nov. 14, 1960
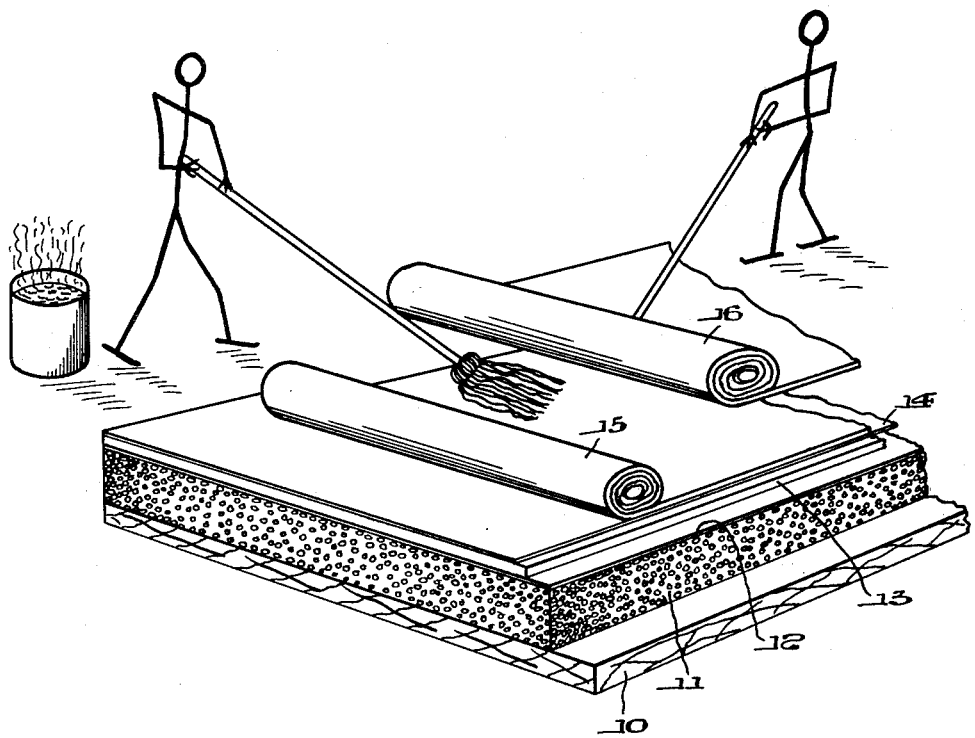
INVENTOR.
MERLE DUDLEY CHAMBERLAIN.
BY
Oscar B. Brumback.
his ATTORNEY

United States Patent Office 3,094,447
Patented June 18, 1963

3,094,447
METHOD OF MAKING AN INSULATED ROOF
Merle D. Chamberlain, Pittsburgh, Pa., assignor to Koppers Company, Inc., a corporation of Delaware
Filed Nov. 14, 1960, Ser. No. 68,788
3 Claims. (Cl. 156—71)

This invention relates generally to built-up roofs and more particularly to a method and apparatus for making insulated built-up roofs.

Built-up roofs are formed of alternate layers of bituminous cement and felt which are assembled or "built-up" in the field. Such roofs generally consist of three to five plies of saturated felt cemented together or "hot mopped" with the bituminous material. The bituminous cement is usually of coal tar or asphalt origin and is applied by mopping between alternate layers of the felt at a temperature of about 400° F. (where it has high fluidity and good penetration properties). The top layer of bituminous material conventionally has embedded therein gravel or slag so as to give protection from foot traffic, sun, and wind.

The addition of insulation to built-up roofing, for example, for the purpose of improving the comfort of personnel or cutting the load on air conditioning equipment has created problems. To maintain the effectiveness of the insulation, for example, a vapor barrier must be added to protect the insulation from moisture which may result from conditions such as high humidity plant processes. If moisture or moisture vapor is entrapped in the insulation the sun's heat causes pressure to build up under the roofing material, thereby causing deleterious conditions such as roof blistering, cracking, and distortion.

This invention provides both a vapor barrier and an insulation known as foam polystyrene. Foam polystyrene is a strong, light weight plastic foam with a discrete, closed-cell structure possessing a smooth skin and a controllable density. For example, the density may range from twenty pounds to one pound or less per cubic foot. The advantageous characteristics of foam polystyrene for use as an insulating material is illustrated by the fact that a typical foam polystyrene having a density of one pound per cubic foot may have a K factor (B.t.u./hr./sq. ft./in.) of 0.24, a compressive strength of 14 p.s.i., a tensile strength of 30 p.s.i., and a permeance of 1.8 perms (grains/hr./sq. ft./in. of Hg). Although foam polystyrene offers unique properties as an insulator it has not been used in built-up roofing because the plastic softens and melts at about 185° F. This property has heretofore not permitted the use of foam polystyrene as roofing insulation for built-up bituminous roof construction where the normal application temperature of the bituminous cement is in the temperature range of 300–450° F.

It has now been found that foam polystyrene can be used in conjunction with built-up roofing in accordance with this invention by a novel process which comprises factory applying roofing felt to foam polystyrene with bituminous material of coal tar or asphaltic origin as adhesive at a low temperature and thereafter carrying out the conventional field applications of plies of roofing felt hot mopped with bituminous cement at conventional application temperature.

The sheet of foam polystyrene for use in this invention may have a density range from twenty pounds to one pound per cubic foot, and the thickness may vary from one inch to six inches or more. As described in "Modern Plastics," June 1960, volume 37, No. 10, pages 87 et seq., such material is available from several producers. The sheets may be prepared by the foaming of expandable polystyrene by the application of heat thereto while the expansion is partially restrained. A typical expandable polystyrene is sold under the trademark "Dylite" and is in the form of beads of polystyrene having incorporated therein from 5 to 15% of an expanding agent such as petroleum ether which has a boiling point lower than the melting point of the polystyrene.

A roofing felt which is initially applied to the sheet of foam polystyrene may be conventional roofing felt. The fibrous material may be any type, such as, for example, cotton, fabric, canvas, woven asbestos, and paper such as kraft paper. The asbestos felts sometimes contain small amounts of material such as hair or starch to assist in the formation of the felt and to aid in the absorption of the bitumen. These felts may be used as such or they may be saturated or impregnated with a bituminous material of petroleum or coal tar origin. A typical tarred felt, for example, may weigh 13–15 pounds per hundred square feet (about five pounds of this is felt and the rest is impregnant), be 36 inches in width, and be sold in the form of tightly wound rolls weighing from 56 to 65 pounds each.

The bituminous cement for applying the felt to the foam polystyrene and for the mopping between layers of felt may be any of the commercial hot-applied asphalt and coal tar bituminous materials. The asphalts vary in softening points (ring and ball) from 140–225° F., the softening and flow resistance increasing with the slope of the roof on which it is to be used. A commercial coal tar roofing pitch for flat roofs, for example, may have the following specifications:

Specific gravity, 25/25° C _____ 1.22–1.34.
Softening point (C.W.) _____ 140–155° F.
Distillation, percent by weight to
  300° C _____ 10.0 maximum.
Specific gravity of distillate to 300°
  C., 38.8° C./15.5° C _____ 1.03 minimum.
$CS_2$ insoluble, percent by weight ____ 15–28.
Flash point (C.O.C.) _____ 248° F. minimum.
Ash, percent by weight _____ 0.5 maximum.
Ductility 25° C. (5 cm. per min.) ___ 50 cm. minimum.

In accordance with this invention a layer of felt is adhered to the polystyrene by heating the bituminous cement to a low temperature and using it as the adhesive. A temperature advantageously used is a temperature within the range of 150–180° F. The bituminous material may b be applied to the sheet of foam polystyrene and the felt applied thereto, or the bituminous material may be applied to the felt and the felt then applied to the foam polystyrene.

Surprisingly, it has been found that the felt adhered to the foam polystyrene offers enough resistance to heat that thereafter the built-up roof may be produced in the normal manner, i.e., the felt may be mopped with bituminous cement at a temperature of up to 400° F. and subsequent layers of felt and bituminous adhesive built up in the well known fashion without materially altering the insulation value and the characteristics of the foam polystyrene.

The foregoing and other objects and novel features of the invention will appear more fully from the following detailed description when the same is read in connection with the accompanying drawing. It is to be expressly understood, however, that the drawing is for purpose of illustration only and is not intended as a definition of the invention.

The single sheet of drawing shows schematically the formation of a built-up roof.

Built-up roofs generally consist of 3 to 5 plies of felt alternately cemented together with hot moppings of bituminous cement; but since the roofs are assembled or built up in the field, the construction varies with the idiosyncrasies of the roofer or the constructor. The slope of the deck to which such roofs are applied may vary from dead level to nearly vertical, and the selection of materials and type of construction, of course, depend upon the slope involved.

The drawing schematically illustrates a built-up roof being applied to a substantially level wood deck 10. The roof comprises a sheet of foam polystyrene 11 which has a felt 12 adhered thereto by using bituminous adhesive at a low temperature and to provide an assembly of foam polystyrene and felt which has had applied thereto by "hot mopping" of bituminous material the layers of felt 13, 14, and 15. In the illustration, hot bituminous cement is being mopped on felt 14 and felt 15 is being applied thereto.

The first layer of felt 12 may be applied to the sheet of foam polystyrene by using the bituminous cement heated to a low temperature as an adhesive. The cement may be applied to either the felt or the foam polystyrene and the felt and foam polystyrene bonded together. The pitch may be applied as in any of the conventional manners. The bituminous adhesive may, for example, be applied as a coating by passing the sheet of felt or foam polystyrene over printing rolls that dip into the coating and contact one side of the sheet, or by flowing the coating on the sheet and scraping or doctoring to the desired thickness. The bituminous cement is advantageously heated to a temperature of 150–180° F. If the temperature of the cement be below 150° it is difficult to coat the sheets and if the temperature be above 180° F., it will cause melting or collapse of the foam structure of the polystyrene. The sheets of felt and foam polystyrene are brought together and laminated while the cement is hot. Advantageously, the laminate is placed under a roll which applies a slight pressure so as to insure complete contact.

While only one side of the foam polystyrene need be coated and have the felt laminated thereto, it is advantageous to coat both sides as such arrangement has a permeance of 1.0 perm or less. The coating is advantageously applied under controlled conditions as in a manufacturing establishment.

The laminated foam polystyrene may be attached to the roof deck in any conventional manner; for example, the laminate may be nailed to the deck or be bonded to the deck with a suitable hot-applied bituminous or a cold-applied adhesive, for example, a rubber-type adhesive such as sold as type $G-58-40_x$ which sets in five to fifteen minutes.

In assembling the roofing system, in the case of a nailable deck, the laminate of foam polystyrene and felt is so placed that the felt is the outer uppermost layer. In the case of a non-nailable deck, the sheet of expanded polystyrene is laminated on both faces with felt and the sheet then adhered to the deck with hot bituminous adhesive in the standard manner. In either case, the hot bituminous cement, for example, at 400° F., may be applied to this felt surface by mopping in a conventional manner and roofing felt applied thereto. This is repeated to form the built-up roof having a desired number of layers of bituminous cement. The last has applied thereto gravel or slag in accordance with the standard procedure.

As a further embodiment, the sheet of foam polystyrene may have laminated thereto corrugated kraft board as the fibrous material with an asphaltic adhesive providing the bond between the kraft board and the sheet of foam polystyrene.

The foregoing has presented a novel process whereby a built-up roof may be readily prepared. The built-up roof includes as an insulation a layer of foam polystyrene. Despite the fact that foam polystyrene normally melts at a low temperature, the built-up roof may be prepared in a normal fashion after a layer of felt had been adhered to the foam polystyrene with bituminous material at a low temperature.

I claim:

1. A method of making a built-up roof which comprises adhering a sheet of felt to a sheet of foam polystyrene by applying thereto a bituminous cement at a low temperature of 150–180° F. as an adhesive to provide a laminate, securing said laminate to the deck of a roof with the felt as the upper layer, and thereafter applying alternate upper layers of bituminous material and felt with the bituminous material at a higher temperature of about 400° F.

2. A method of producing an insulated roof comprising laying a first layer of foam polystyrene, covering said layer of foam polystyrene with a layer of bituminous material, heated to a temperature of 150–180° F., covering said layer of bituminous with at least one layer of felt to which is applied bituminous cement which is heated to a temperature of at least 400° F.

3. An insulated built-up roof produced by applying to one of the sheets of felt and of foam polystyrene a bitumen cement at a low temperature of 150–180° F. as an adhesive, pressing said sheets together to form a laminate, applying said laminate to the deck of a roof so that the felt is the upper layer, and thereafter alternately applying upper layers of bituminous material and felt thereto with the bituminous material at a higher temperature of about 400° F. so as to form said insulated built-up roof.

References Cited in the file of this patent

UNITED STATES PATENTS

| | | |
|---|---|---|
| 1,902,298 | Avery et al. | Mar. 21, 1933 |
| 2,721,816 | Wood | Oct. 25, 1955 |
| 2,730,772 | Jones | Jan. 17, 1956 |
| 2,893,907 | Bove | July 7, 1959 |
| 2,972,559 | Allen et al. | Feb. 21, 1961 |
| 3,029,172 | Glass | Apr. 10, 1962 |